United States Patent
Di Crispino et al.

[15] 3,673,862
[45] July 4, 1972

[54] TRIAXIAL STRESS TEST APPARATUS

[72] Inventors: Joseph S. Di Crispino, 4030 Raleigh Road, Baltimore, Md. 21208; Leslie M. Kaldor, 25 Sheridan Road, Arnold, Md. 21012

[22] Filed: Sept. 25, 1970

[21] Appl. No.: 75,595

[52] U.S. Cl.................................................73/102, 73/37
[51] Int. Cl. ............................................................G01n 3/10
[58] Field of Search......................73/37, 49.8, 102, 12, 49.2

[56] References Cited

UNITED STATES PATENTS 3,105,414   10/1963   Cvjetkovic..............................73/12 X
3,557,607   1/1971    Riddell et al..............................73/49.2

*Primary Examiner*—Jerry W. Myracle
*Attorney*—R. S. Sciascia and Q. E. Hodges

[57] ABSTRACT

Apparatus for testing spherical tank critical sections exposed to external and internal fluid pressure in which triaxial stresses are induced in full size representative samples of hard structure containments for use in fuel cell applications in deep submergence environments.

3 Claims, 3 Drawing Figures

3,673,862

TRIAXIAL STRESS TEST APPARATUS

The invention described herein may be manufactured and used by or for the Government of the United States of America for Governmental purposes without the payment of any royalties thereon or therefor.

BACKGROUND OF THE INVENTION

The present invention relates broadly to the testing of structures and, more particularly, is concerned with destructive testing of spherical sections of structural members. More specifically, this invention relates to the testing of a load-bearing spherical section having a minimum critical arc length which simulates the stress levels in a total sphere employed as a hydrostatic pressure-resisting structural component in a deep submergence vehicle.

Considerable interest has been aroused in recent years in particular facets of oceanography as related to deep sea exploration.

Consequently, the investigation and development of new materials and structural designs for deep submersibles is of primary concern in the planning of various oceanographic research projects.

In many situations it is desirable to fabricate undersea containments from relatively high strength materials in order to withstand the hydrostatic pressures encountered at various ocean depths. As research vehicles descend to greater depths, the thickness of the containment materials must be increased since high strength materials have yield strengths which closely approach the ultimate strength of the materials. Moreover, because such high strength materials used for deep submergence equipments are less ductile than conventional hull materials, factors of safety must be accurately determined, since failure modes are generally catastrophic.

In addition to the hydrostatic pressures acting on hull structures, consideration must in certain instances also be given to factors affecting the inside of spherical structures employed particularly as fuel cell containment vessels wherein exposure of the inside surface of the containment to cryogenic reactants or corrosive working fluids will adversely affect the material by diminishing the effective yield strength of a particular structural material.

SUMMARY OF THE INVENTION

The general purpose of this invention is to provide an apparatus for testing full size spherical sections, in whatever manner fabricated, of minimum critical arc length, in a manner to simulate stress levels expected to be achieved in total structures.

To attain this, the present invention provides means for supporting a spherical section in the test apparatus and for introducing fluid under pressure as desired into chambers contacting both sides of the test specimen so that the effects of various fluctuations of external and internal pressure and resulting fatigue on the test specimen can be recorded.

OBJECTS OF THE INVENTION

It is a principal object of the instant invention to provide apparatus for destructive testing of structural members.

It is a further object of the instant invention to provide test apparatus wherein the elastic limit of a structural member under test is readily observed during the test.

Still object of the instant invention is to provide test apparatus wherein a test specimen becomes a permanent visible record of the test.

A still further object of the present invention is to provide an apparatus capable of determining the actual stress at which a test specimen will fail, and accordingly, measures the strength of the specimen material.

Another object of the present invention is to provide apparatus for simultaneously testing the internal and external surfaces of a structural specimen.

These and other objects and advantages of the invention will more fully appear from the following description made in connection with the accompanying drawing wherein like reference characters refer to the same or similar parts throughout the several views and in which:

DESCRIPTION OF THE PREFERRED EMBODIMENT

Figure 1:
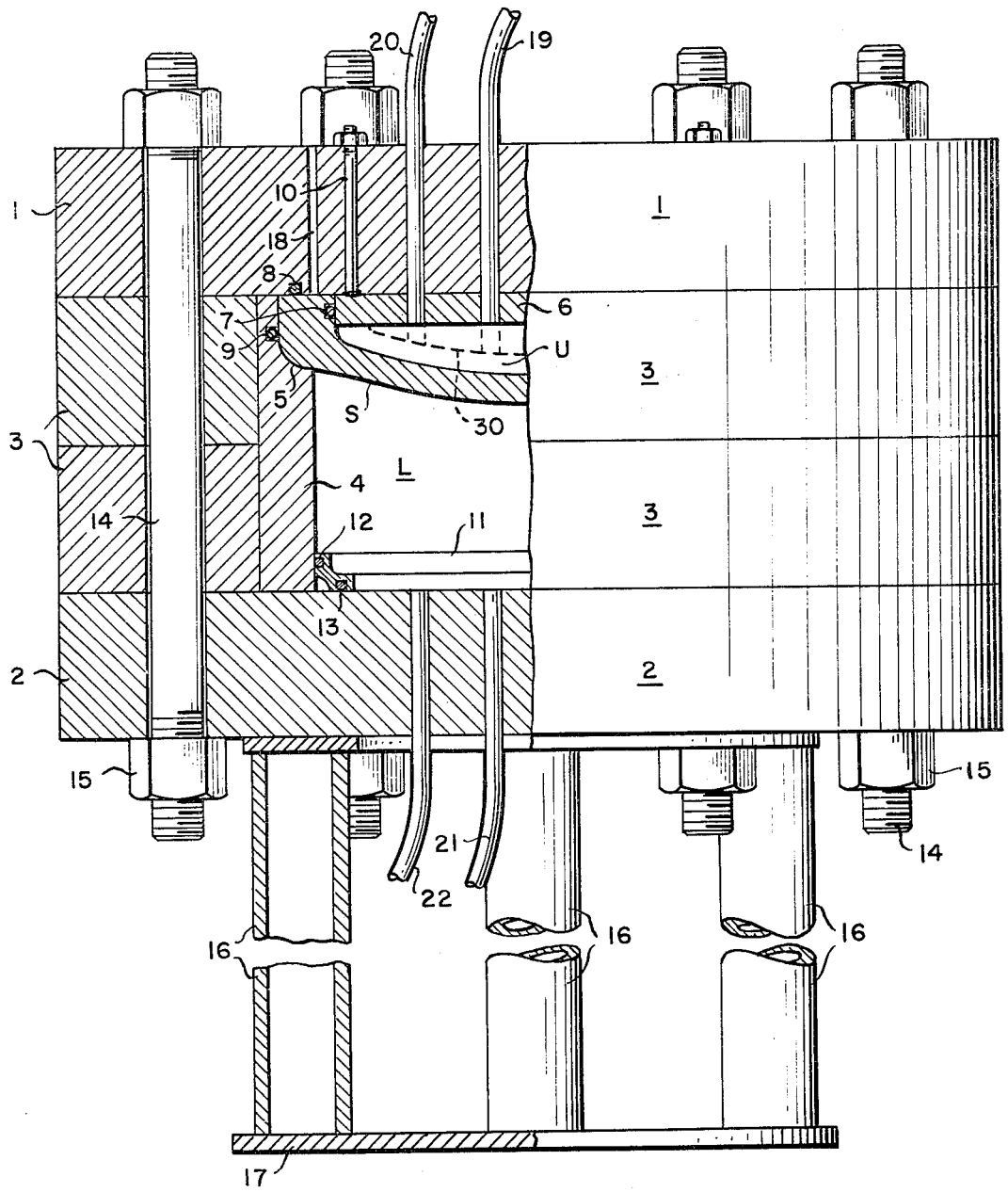
FIG. 1 is a view, partly in section, of the test apparatus showing the spherical test specimen in place.

With continued reference to the drawings. FIG. 1 shows a cylindrical test apparatus A with a spherical section test specimen S in place and ready to receive applied forces.

Test apparatus, as shown in FIG. 1, comprises a top closure member 1, a bottom closure member 2, and a plurality of retaining rings 3. Said retaining rings concentrically confine the pressure cylinder 4 which is clamped between said top and bottom closure members. The pressure cylinder has been machined with the annular notch 5 to retain the test specimen. The test specimen S is further held in position by the pressure plate 6 which is in turn secured to top closure member 1 by studs 10 welded to upper surface of the pressure plate 6 as shown in FIG. 1. Pressure plate 6, top closure member 1 and pressure cylinder 4 are all grooved and provided with "O" rings 7, 8 and 9 to effectively seal the upper chamber U corresponding to the inside of a full sized spherical member. The lower chamber L is effectively sealed by "O" ring 9 and by sealing ring 11 having grooves receiving "O" rings 12 and 13. The entire testing apparatus is clamped together by a plurality of threaded shafts 14 and nuts 15. Leg members 16 are welded to the under surface of bottom closure member 2 and are in turn welded to base plate 17 to provide a convenient support for the testing apparatus.

In reference to FIG. 1 it should be noted that "O" rings 12, 13, 7, 8 and 9 are located to positively seal off the upper and lower chambers irrespective of the direction of a pressure differential. Top closure member 1 contains an additional passage 18 which cooperates with the "O" rings 7 and 8 to bleed off any trapped gases between the pressure plate 6 and the top closure member 1. Fluid pressure may be admitted to the upper and lower chamber, U and L, respectively, in any convenient manner. In the preferred embodiment, however, high pressure fluid is introduced or withdrawn for purging, as desired, independantly into the upper and lower chambers through the ports 19, 20, and 21 and 22, respectively. The ports are connected to suitable valving devices (not shown) to control the quantity of fluid admitted. Pressure indicating devices (not shown) may also be affixed to the test apparatus in any convenient manner. Varous fluids such as seawater, fuels and corrosive liquids and gases may be used to simulate actual operational conditions.

FIG. 1 also illustrates the use of optional solid plug 30 which is used when the upper chamber U is to be filled with high pressure explosive gas. The solid plug 30 is removably fastened to pressure plate 6 by conventional means such as drilling and tapping (not shown) a minimum amount into, but not through, pressure plate 6. The solid plug thereby minimizes the mass content of the upper chamber of dangerous explosive material for safety purposes.

Figure 2:
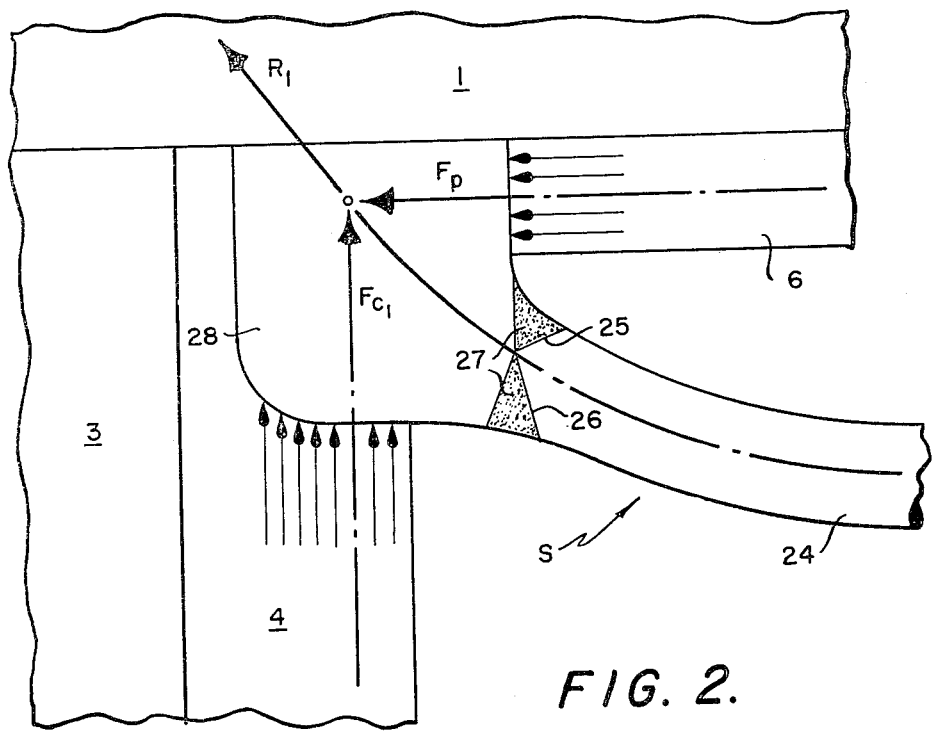
FIGS. 2 and 3 are section views of the edge portion of the test specimen under certain stress conditions.
Figure 3:
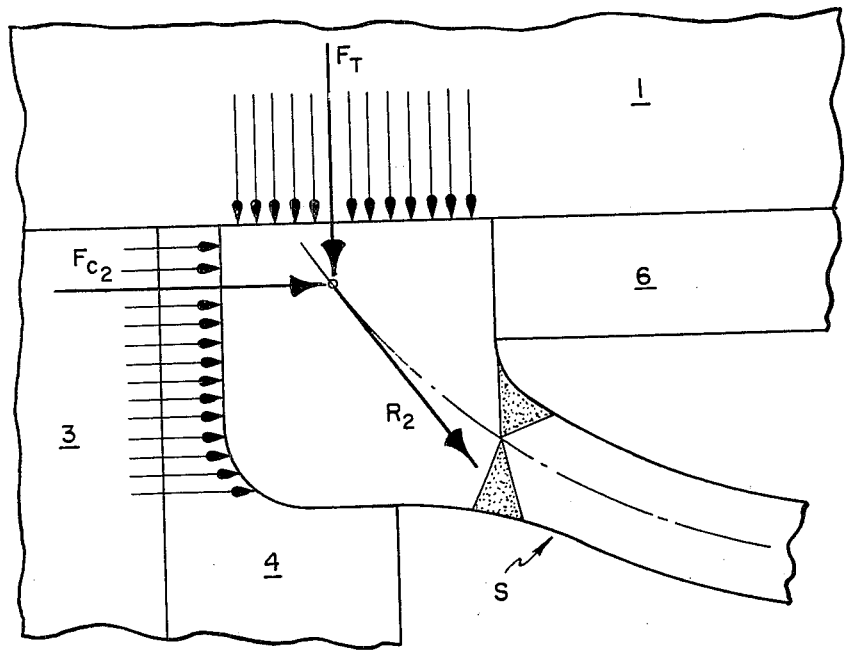

FIGS. 2 and 3 are stress diagrams illustrating resultant forces in the test specimen S under opposite pressure differentials and the appropriate support required to simulate conditions on a full sized spherical member. In FIG. 2 the internal pressure in the upper chamber is greater than that of the lower chamber which would correspond to the condition existing when a full scale spherical tank is completely full and is located at a shallow test depth. The test specimen S is held by pressure cylinder 4 and pressure plate 6 whose forces are represented by $F_{c1}$ and $F_p$. The resultant force is $R_1$ which lies along a tangential line through the radial center line of the test sample's cross-section thereby duplicating the rupture forces that would be exerted on a full scale spherical tank. FIG. 2 also illustrates the preferred construction of the test specimen S. The test specimen S comprises a spherical plate section 24 the circumference of which has been machined at 25 and 26 at angles corresponding to the arc and the size of the section tested. The plate section is welded at 27 to a ring 28 which is clamped as shown in FIG. 1.

In FIG. 3 the pressure of the fluid in the lower chamber L is greater than the pressure in the upper chamber U which corresponds to the forces on a spherical tank when the tank would be empty and at maximum depth. The test specimen S is constrained by the pressure cylinder 4 and top closure member 1 as illustrated by $F_{c2}$ and $F_T$, respectively. The resultant force $R_2$ again lies along a tangential line to the radial center line of the test sample's cross-section, thereby simulating forces on a full scale spherical tank. The specific mounting illustrated in FIGS. 2 and 3 eliminates the possibility of the test specimen failure due to clamping forces and moments created by the clamping forces. The specific tolerances for example, between pressure plate 6 and the test specimen S can, by computer mathematical analysis, be determined to create the desired stress duplication.

Further holes (not shown) may be drilled in the top and bottom closure members 1 and 2 and the pressure plate 6 to provide adequate instrumentation for strain gauges, etc., as required.

In addition to plain spherical sections the present testing apparatus can be used to test sections having isolation valves, bosses or weldments (not shown) that are integral critical parts of a total sphere for evaluation purposes.

It will be apparent from the foregoing that the invention provides apparatus of novel and advantageous construction by which spherical specimens of containment cells may be tested expeditiously and the physical properties thereof may be easily observed. The improved apparatus is simple and rugged in construction and may be used repeatedly for testing purposes.

It is understood that the invention is not limited to the exact details of construction shown and described, for obvious modifications will occur to persons skilled in the art. It is therefore to be understood that within the scope of the appended claims the invention may be practiced otherwise than as specifically described.

WHat is claimed is:

1. A device for testing spherical sections under pressure comprising:

a cylindrical vessel designed to withstand high pressures, said vessel having a top and a bottom closure member, said top closure member being removably attached to said vessel;

clamping means for clamping the peripheral edge of the spherical section both radially and axially with respect to the axis of the cylindrical vessel such that the specimen divides said vessel into an upper and lower fluid tight chamber;

first and second means for introducing and removing fluid under pressure from the two chambers, said first means being connected to the upper chamber and said second means being connected to said lower chamber.

2. The apparatus of claim 1 wherein said clamping means comprises:

a cylindrical shoulder connected to said top closure, said cylindrical shoulder having a smaller outside diameter than the inside diameter of the cylindrical test vessel, said shoulder engaging the concave peripheral edge of the spherical section in the radial direction with respect to the axis of the cylindrical test vessel;

a support shoulder connected to and extending radially inward from said cylindrical test vessel, said support shoulder contacting the convex peripheral edge of the spherical section radially and axially with respect to the axis of the cylindrical test vessel.

3. The apparatus of claim 2 wherein said contacting surfaces are provided with grooves and complementary O-rings for pressure sealing.

* * * * *